(12) United States Patent
Delahaye et al.

(10) Patent No.: US 8,403,261 B2
(45) Date of Patent: Mar. 26, 2013

(54) PROCESS FOR MAKING AN AIRCRAFT HAVING A FLOOR

(75) Inventors: Romain Delahaye, Colomiers (FR); Guillaume Gallant, Lareole (FR)

(73) Assignee: Airbus Operations, Toulouse (FR)

( * ) Notice: Subject to any disclaimer, the term of this patent is extended or adjusted under 35 U.S.C. 154(b) by 262 days.

(21) Appl. No.: 12/823,256

(22) Filed: Jun. 25, 2010

(65) Prior Publication Data

US 2011/0001006 A1    Jan. 6, 2011

(30) Foreign Application Priority Data

Jul. 2, 2009 (FR) ...................... 09 54558

(51) Int. Cl.
*B64D 11/00* (2006.01)
*B64D 13/00* (2006.01)

(52) U.S. Cl. ...................... 244/118.5; 244/119

(58) Field of Classification Search ............... 244/118.1, 244/119, 117 R, 131; 52/177, 650, 783.1, 52/783.14, 783.18, 791.1, 793.1, 220.1, 220.3, 52/220.4, 650.3
See application file for complete search history.

(56) References Cited

U.S. PATENT DOCUMENTS

| | | | | |
|---|---|---|---|---|
| 2,412,778 A * | 12/1946 | Kosek | ........................... | 244/120 |
| 4,185,799 A * | 1/1980 | Richards, Jr. | ............... | 244/118.5 |
| 4,338,484 A * | 7/1982 | Littrell | ........................... | 174/482 |
| 4,479,621 A * | 10/1984 | Bergholz | .................. | 244/117 R |
| 4,989,809 A * | 2/1991 | Arnold | ........................ | 244/137.1 |
| 5,086,996 A * | 2/1992 | Roeder et al. | ................. | 244/119 |
| 5,263,289 A * | 11/1993 | Boyd | ........................... | 52/220.2 |
| 5,752,673 A * | 5/1998 | Schliwa et al. | ............. | 244/118.6 |
| 5,890,768 A * | 4/1999 | Beurteaux et al. | ......... | 297/463.1 |
| 6,467,118 B2 * | 10/2002 | Dumlao et al. | .................... | 14/73 |
| 6,517,028 B2 * | 2/2003 | Huber | ........................ | 244/137.1 |
| 6,554,225 B1 | 4/2003 | Anast et al. | | |
| 6,659,402 B1 * | 12/2003 | Prochaska | .................. | 244/118.6 |
| 7,393,488 B2 * | 7/2008 | Grose et al. | ................... | 264/254 |
| 7,721,992 B2 * | 5/2010 | Keeler et al. | .................. | 244/119 |
| 8,074,928 B2 * | 12/2011 | Haack et al. | .................. | 244/119 |
| 8,167,231 B2 * | 5/2012 | Leisten et al. | ................ | 244/1 A |
| 8,205,832 B2 * | 6/2012 | Schroeer et al. | ............. | 244/119 |
| 2007/0095978 A1 * | 5/2007 | Oetken et al. | ............. | 244/118.1 |
| 2007/0176048 A1 * | 8/2007 | Huber et al. | .................. | 244/119 |
| 2008/0093503 A1 * | 4/2008 | Cacciaguerra | ............... | 244/119 |
| 2008/0169681 A1 * | 7/2008 | Hedderly | ................ | 296/193.07 |
| 2008/0210820 A1 * | 9/2008 | Kismarton et al. | .......... | 244/120 |
| 2008/0217478 A1 * | 9/2008 | Keeler et al. | .................. | 244/119 |

(Continued)

FOREIGN PATENT DOCUMENTS

WO    WO 2007/057411 A1    5/2007
WO    WO 2007/122246 A1    11/2007

(Continued)

OTHER PUBLICATIONS

Preliminary Search Report issued on Mar. 1, 2010 in French Patent Application No. FR 0954558 (with translation).

*Primary Examiner* — Tien Dinh
*Assistant Examiner* — Michael A Fabula
(74) *Attorney, Agent, or Firm* — Oliff & Berridge, PLC

(57) ABSTRACT

The method of fabricating an aircraft comprises the following steps: fastening two lateral floor portions, each firstly to a fuselage element and secondly to supports that are connected to the fuselage element; and then bringing a middle floor portion between the lateral portions and connecting it to the lateral portions.

11 Claims, 8 Drawing Sheets

U.S. PATENT DOCUMENTS

| | | | |
|---|---|---|---|
| 2008/0277528 A1* | 11/2008 | Frantz et al. | 244/118.5 |
| 2009/0236472 A1* | 9/2009 | Wood | 244/119 |
| 2010/0044510 A1* | 2/2010 | Schroeer et al. | 244/119 |
| 2010/0116934 A1* | 5/2010 | Herzog et al. | 244/118.5 |
| 2011/0001006 A1* | 1/2011 | Delahaye et al. | 244/118.5 |
| 2011/0001008 A1* | 1/2011 | Delahaye et al. | 244/119 |
| 2011/0036946 A1* | 2/2011 | Depeige et al. | 244/120 |
| 2011/0270571 A1* | 11/2011 | Cobb et al. | 702/150 |

FOREIGN PATENT DOCUMENTS

| | | |
|---|---|---|
| WO | WO 2007/141291 A1 | 12/2007 |
| WO | WO 2009/138593 A2 | 11/2009 |

\* cited by examiner

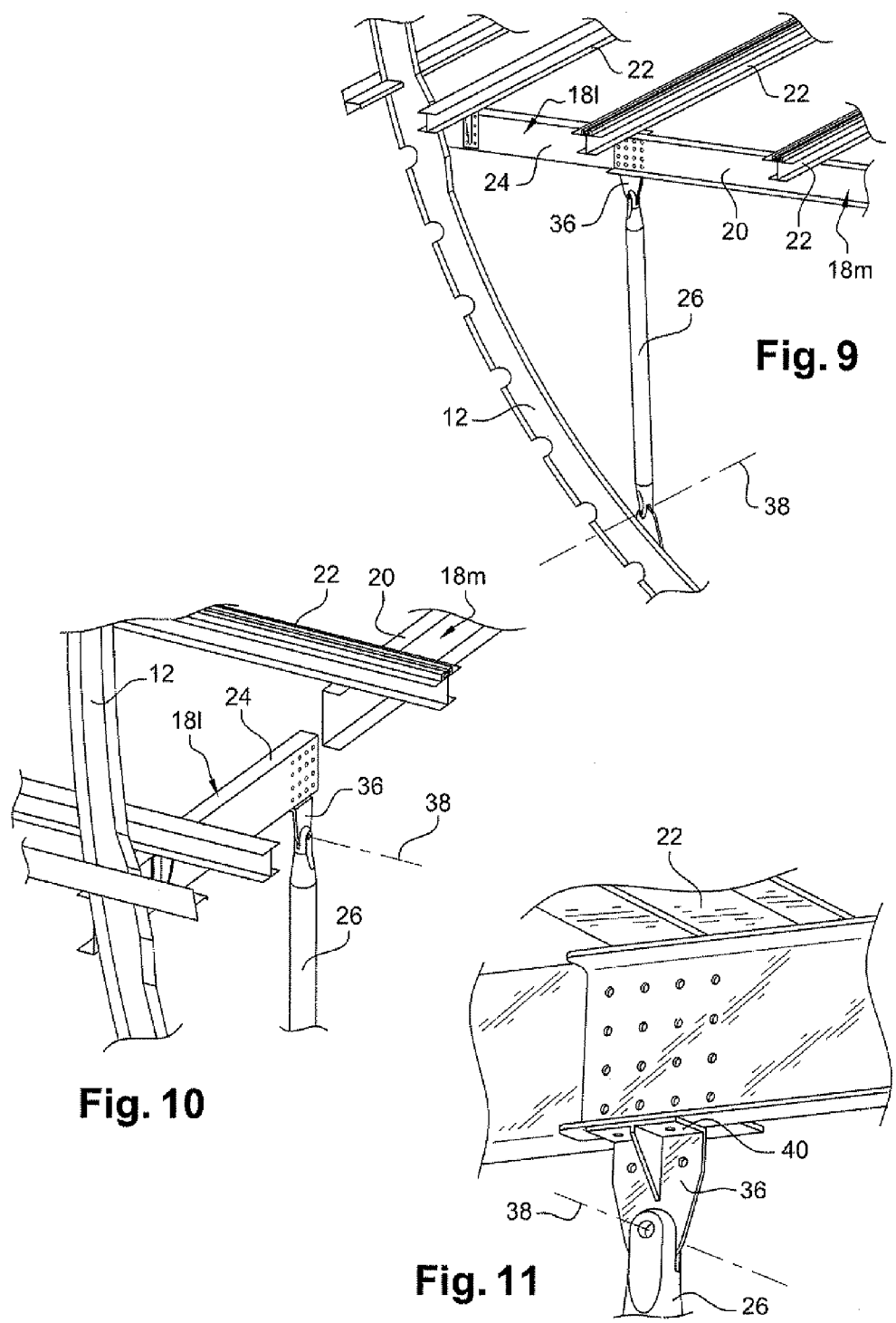

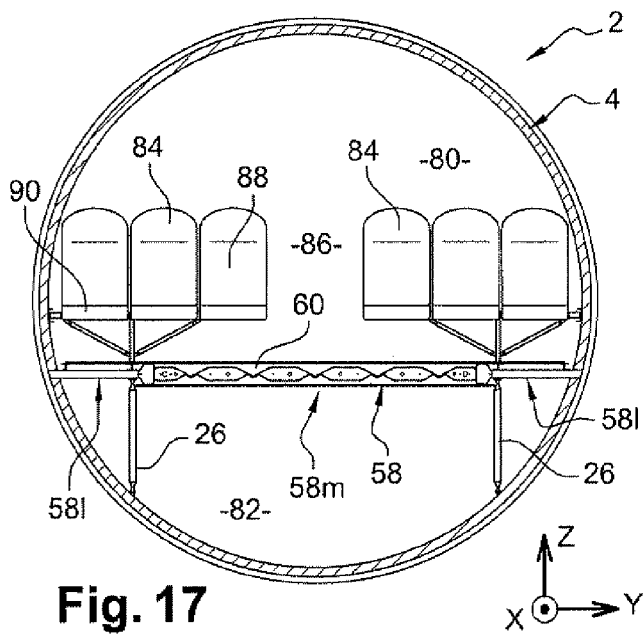
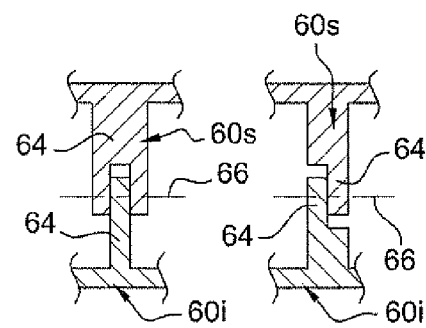
Fig. 17   Fig. 20   Fig. 21
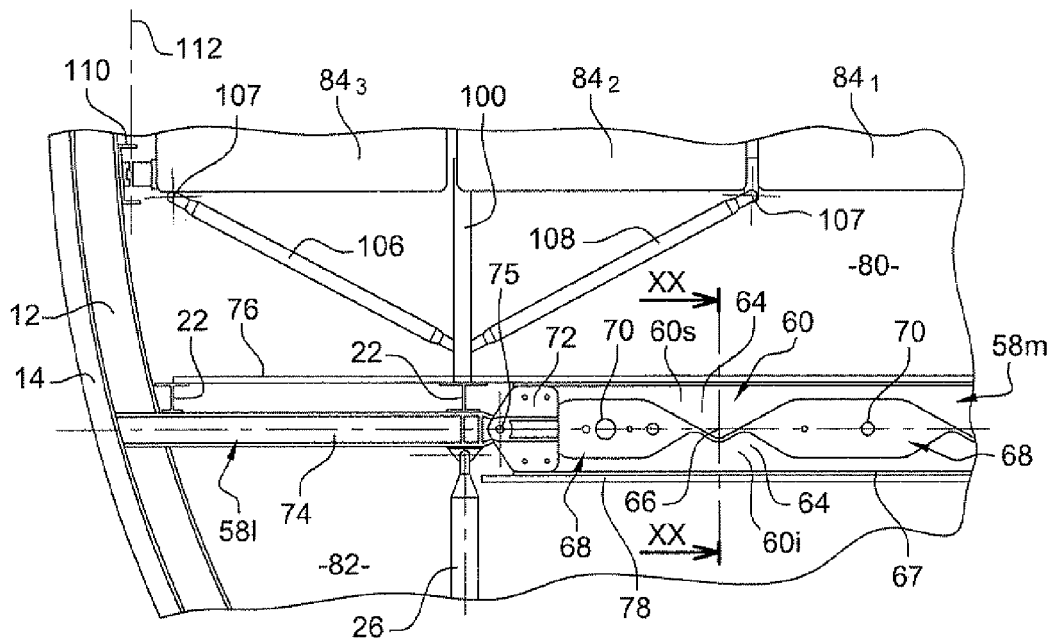
Fig. 18

PROCESS FOR MAKING AN AIRCRAFT HAVING A FLOOR

The invention relates to aircraft, and in particular to aircraft floors.

BACKGROUND OF THE INVENTION

When building an aircraft, it is known to begin by making a lower section of a segment of the fuselage. This lower section constituting the bottom portion of the segment is upwardly open. The portion of the floor that occupies this segment is then inserted through the upward opening. Thereafter, the various systems and members that are to be fastened to the fuselage and to the floor are mounted in the assembly. These may be hydraulic or pneumatic members (compressed air or air conditioning ducts, water ducts, refrigeration ducts, oxygen ducts), electric cables, fire extinguisher circuit elements, or indeed ducts for on-board communications networks. These various members are fastened to the underside of the floor or to the fuselage, e.g. in the zones referred to as "triangular" zones because of their shape, i.e. the zones that are close to the junction between the floor and the fuselage.

Nevertheless, that method of mounting presents drawbacks. Thus, it is necessary to wait until the structure (the fuselage and the floor) have finished being assembled before beginning to put the systems into place, thereby lengthening the overall time required to build the aircraft. Furthermore, introducing systems into the triangular zones raises ergonomic problems for operators. Those zones constitute a confined space that is of difficult access, obliging operators to work in crouching or even prone positions, particularly in fuselages of small diameter.

OBJECT AND SUMMARY OF THE INVENTION

An object of the invention is to accelerate and facilitate the building of the aircraft.

To this end, the invention provides a method of fabricating an aircraft, the method comprising the following steps:
  fastening two lateral floor portions, each firstly to a fuselage element and secondly to supports that are connected to the fuselage element; and then
  bringing a middle floor portion between the lateral portions and connecting it to the lateral portions.

Thus, the two lateral portions are mounted initially and the middle portion is mounted only subsequently. After the lateral portions have been mounted, it is possible to assemble systems in the triangular zones immediately, without waiting for the middle portion to be installed. Access thereto when the middle portion is absent becomes relatively easy and relatively ergonomic. In particular, operators can remain standing while they are installing systems. Furthermore, certain systems may be mounted on the middle portion of the floor before it is brought into the fuselage so as to be fastened to the lateral portions. Once more, conditions for mounting such systems are greatly improved, so far as the operators are concerned, since the middle portion is not yet installed in the fuselage. In addition, it is possible to assemble systems on the middle portion away from the main assembly line while the triangular zones of the fuselage are receiving the systems that are associated therewith. The corresponding operations can therefore be performed in parallel, thereby enabling the overall time required to build the aircraft to be reduced. Furthermore, the invention presents the advantage that the middle portion, which by definition has dimensions that are smaller than the overall dimensions of the floor, may be inserted even after the top portion of the fuselage segment has been secured to the bottom portion, thereby closing its top. Since the middle portion is of small size, it does not interfere with the frames while it is being inserted into a closed fuselage, and it is entirely possible to introduce the middle portion through the front or rear opening of the fuselage segment. In addition, the freedom thus provided for assembling the entire fuselage segment prior to inserting the middle portion of the floor makes the method of building the aircraft even more flexible, thereby also helping shorten the overall time required for assembly.

Advantageously, during the fastening step and before bringing in the middle portion, at least one member of the aircraft having a function other than a mechanical function for the floor or the fuselage is placed under the lateral portions.

Thus, advantage is taken of the absence of the middle portion, thereby making this operation more convenient.

Advantageously, prior to bringing in the middle portion, the middle portion is fitted with at least one member of the aircraft that has a function other than a mechanical function for the floor.

Likewise, advantage is taken of the fact that the middle portion is not yet installed in the fuselage, thereby making it easier to put the members into place.

In an implementation, top partial crossmembers are assembled with bottom partial crossmembers so as to form crossmembers of the middle portion, leaving at least one gap between the top partial crossmember and the bottom partial crossmember of each crossmember.

Thus, this arrangement does not significantly modify the mechanical properties of the crossmembers. In particular, each crossmember made up of top and bottom partial crossmembers presents substantially the same second moment of area as a conventional one-piece crossmember. This second moment of area comes from the relatively tall height that can be given to the crossmember made up of two partial crossmembers. In contrast, the gap available between the top and bottom partial crossmembers is useful for housing members such as those mentioned above, instead of placing them under the floor. This results in more space being made free under the floor. It is thus possible to increase the volume available for a cargo zone, or on the contrary, by lowering the floor, to increase the volume available in the cabin. It is also possible to take advantage of this greater compactness to reduce the total section of the fuselage. Conversely, for unchanging compactness, it is possible to increase the total height of the crossmembers of the floor so as to enable the floor to contain systems that are more voluminous than those that have been associated with the floor in the prior art. Furthermore, systems may be put into place between the partial crossmembers before they are connected together to constitute the crossmembers. This makes it much easier to install such systems, and in particular makes installing them more ergonomic for operators.

The invention also provides an aircraft that comprises:
  two lateral floor portions, each fastened both to the fuselage and to supports connected to the fuselage; and
  a middle floor portion that is distinct from the lateral portions and that is connected to the lateral portions.

The aircraft of the invention may also present at least any one of the following characteristics:
  the lateral portions are fastened to the middle portion by means of faces of the lateral and middle portions that are perpendicular to a longitudinal direction of the fuselage;
  the lateral portions are fastened directly to the middle portion;

the lateral portions are fastened to the middle portion by means of faces of the lateral and middle portions that are horizontal;

the lateral portions are fastened to the middle portion with parts of the lateral and middle portions that are placed so as to extend one another;

the lateral portions are fastened to the middle portion with parts of the lateral and middle portions that are placed back to back;

the lateral portions are fastened to the middle portion via at least one connection part, e.g. by means of a rail;

the lateral portions are fastened to the middle portion using parts of the lateral and middle portions that are placed one inside another; and the lateral portions are fastened to the middle portion by mutually superposing walls of the lateral and middle portions.

In an embodiment, the middle portion includes crossmembers, each crossmember comprising a top partial crossmember and a bottom partial crossmember, with at least one gap being arranged between the top partial crossmember and the bottom partial crossmember of each crossmember.

Advantageously, the aircraft includes at least one row of passenger seats, the seats being associated with supports supporting respective seats in full, one of the seats being adjacent to an aisle, and the support of the seat that is adjacent to the aisle being connected to the fuselage and to the floor solely via the support of the seat that is adjacent thereto in the row.

Thus, at least one seat contiguous with the aisle is in a cantilevered arrangement. This means that the seats of the row bear against the floor at a greater distance away from the middle axis of the fuselage, thereby shortening the path via which loads are transmitted to the main structure of the fuselage and simplifying the design of the parts.

BRIEF DESCRIPTION OF THE DRAWINGS

Other characteristics and advantages of the invention appear further from the following description of embodiments given as non-limiting examples and with reference to the accompanying drawings, in which:

FIG. 9 is a view analogous to FIG. 3 showing a second embodiment;

FIG. 10 shows the elements of FIG. 9 during assembly;

FIG. 11 is a view on a larger scale showing a detail of the FIG. 9 assembly;

FIG. 17 is a section view of an airplane fuselage in a fourth embodiment, in a plane perpendicular to the longitudinal direction of the fuselage;

FIG. 18 is a fragmentary view on a larger scale of a portion of the FIG. 17 fuselage;

FIG. 20 is a section view on plane XX-XX of the FIG. 18 crossmember;

FIG. 21 is a view analogous to FIG. 20, showing a variant embodiment;

MORE DETAILED DESCRIPTION

Figure 1:
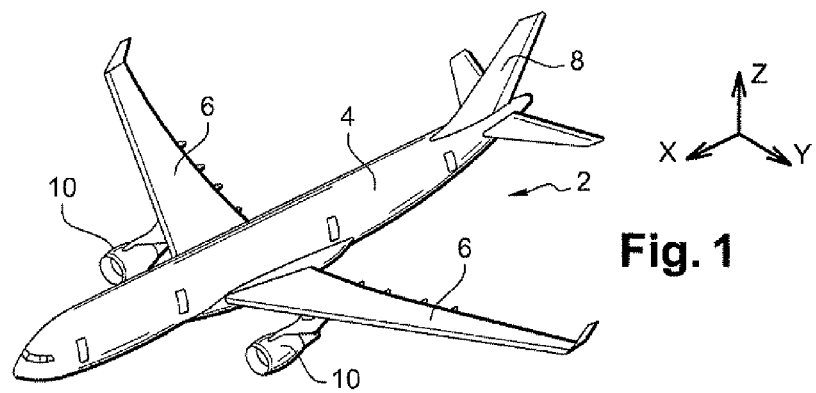
FIG. 1 is a perspective view of an aircraft of the invention.

With reference to FIG. 1, the aircraft 2 of the invention in the embodiment described below is constituted by an aerodyne, and specifically an airplane. The airplane 2 has a fuselage 4, two wings 6, a tail 8, and engines 10, specifically two engines fastened to the wings in this example.

An X, Y, and Z frame of reference is used below in which the direction X designates the longitudinal horizontal direction of the fuselage, the direction Y designates the horizontal direction perpendicular to the direction X, and the direction Z designates the vertical direction.

Figure 2:
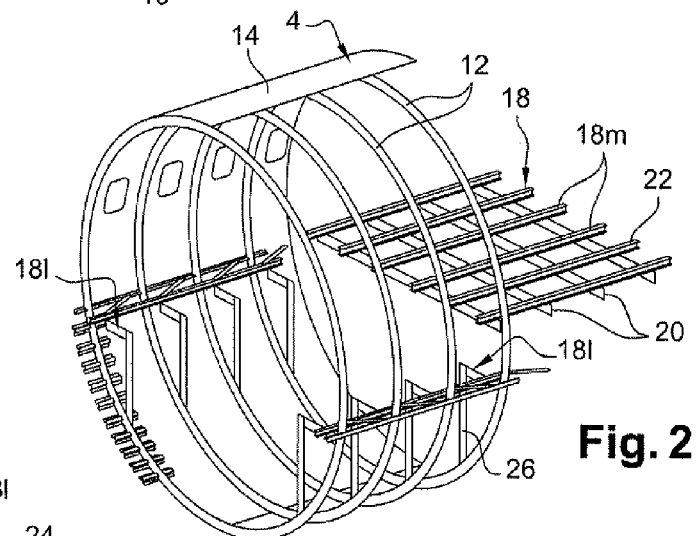
FIG. 2 is a partially cutaway perspective view of a segment of the fuselage of the FIG. 1 aircraft while receiving a middle floor portion.

Over the major fraction of its length, the fuselage presents a generally cylindrical shape of axis parallel to the direction X, and of section that is generally circular in a plane perpendicular to said direction. A segment of the fuselage during assembly is shown in FIG. 2. The description below relates to this segment, it being understood that the fuselage may comprise a plurality of segments made up in the same manner and located one after another.

The fuselage 4 comprises mutually identical frames 12. The frames 12 in this example are generally circular in shape, each extending in a vertical plane. The axes of the frames coincide with the longitudinal axis of the fuselage. The frames are mutually parallel, facing one another, and spaced apart from one another. The fuselage has a wall 14 of generally cylindrical shape fastened to the frames 12 by means of elements such as stringers 16. Each stringer is in the form of a section member extending in the direction X and it is fastened via its outside face to an inside face of the wall 14, while also being fastened via its inside face to the frame 12. The stringers extend parallel to one another around the frame with which they are associated.

In a first embodiment, the segment contains a floor 18 comprising two lateral portions 18*l*, respectively left and right portions, and a middle portion 18*m*. The middle portion 18*m* extends between the lateral portions 18*l*. The overall shape of the floor 18 is generally that of a horizontal plane.

The middle portion 18*m* has crossmembers 20 formed by rectilinear section members extending in the direction Y. The crossmembers 20 are parallel to one another, facing one another, and spaced apart from one another. They all lie in the same plane. The middle portion 18*m* also has rails 22, likewise formed by rectilinear section members extending parallel to one another, facing one another, and spaced apart from one another, but this time along the direction X. All of the rails 22 lie in the same plane. The rails are fastened to the crossmembers 20, with the bases of the rails being in contact with the tops of the crossmembers.

Figure 3:
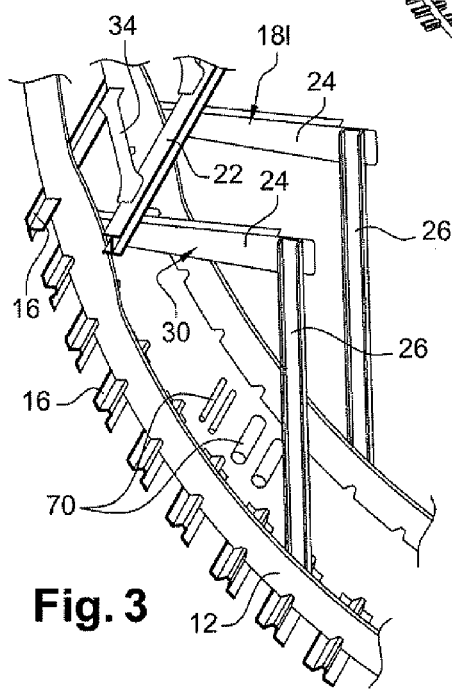
FIGS. 3 and 4 are views on a larger scale showing details of the FIG. 2 structure.

With reference in particular to FIG. 3, which shows the left lateral portion, each of the lateral portions has section members formed in this example by battens 24. The battens are in a disposition analogous to that of the crossmembers 20 of the middle portion. They thus extend in particular in the direction Y. They are disposed in such a manner as to come into contact with the corresponding ends of the respective crossmembers, as explained below. The inside end of each batten is rigidly fastened to the end of the corresponding crossmember. The outside end of each batten is rigidly fastened to the frame 12 where the batten is located. The inside end of each batten is also associated with a support such as a post 26 formed by a section member extending vertically. The top end of the post is rigidly fastened to a batten, while its bottom end is rigidly fastened to the same frame that is already fastened to the other end of the batten. The floor is made in such a manner that each frame 12 corresponds to a crossmember 20, to two battens 24 respectively on the left and on the right, and two posts 26, all of these parts extending substantially in the same plane perpendicular to the direction X.

Figure 4:
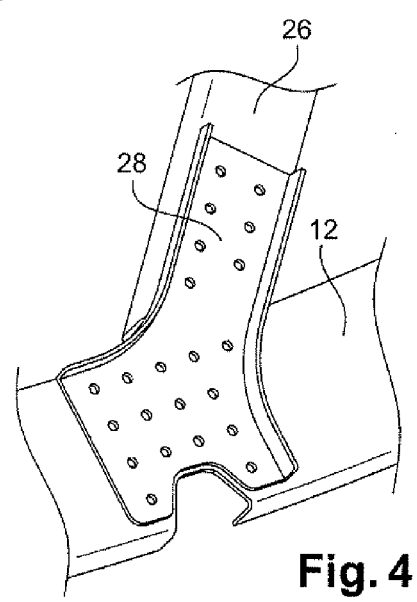

In the present example, and as shown in FIG. 4, the bottom end of the post 26 is fastened to the frame 12 via a fastener 28 having a common face, specifically a front face, that comes into contact with a rear face of the post and with a rear face of the frame. The fastener 28 is rigidly fastened, e.g. by means of rivets, both to the post and to the frame.

Figure 5:
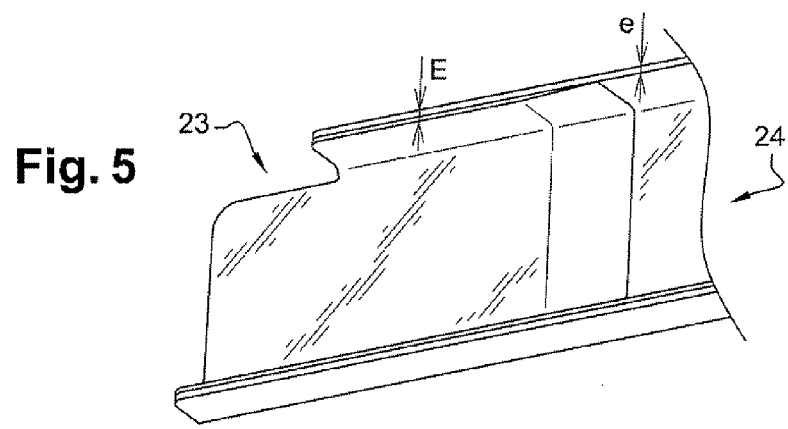
FIG. 5 is a fragmentary perspective view of one of the battens of the FIG. 2 structure.

With reference in particular to FIGS. 5 to 8, each batten 24 in the present example is a generally channel-section member. The inside end of the batten shown in FIG. 5 is cut away by a recess 23 in its top edge, and over a short height of the top portion of the main wall of the section member. In the present example, the front face 30 of the web of the batten is in contact with a rear face of the frame 12 and these two parts are assembled together by means of rivets.

Figure 6:
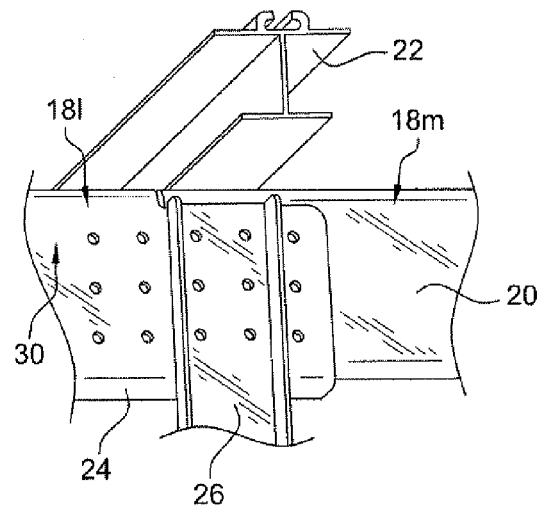
FIG. 6 is a fragmentary perspective view showing a detail of how the FIG. 2 floor is assembled.
Figure 7:
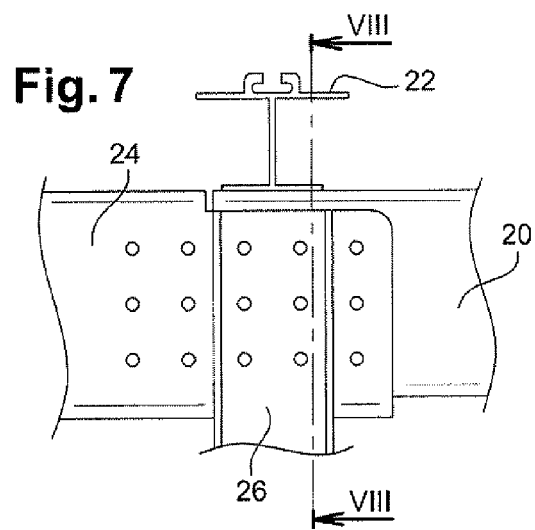
FIG. 7 is a face view of the elements of FIG. 6.
Figure 8:
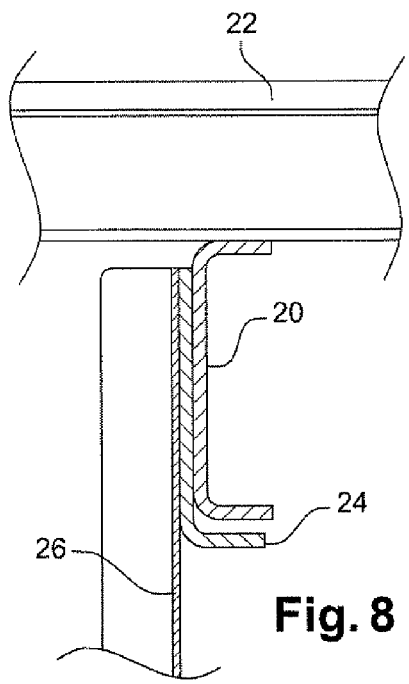
FIG. 8 is a section view on plane VIII-VIII of the elements of FIG. 7.
Figure 12:
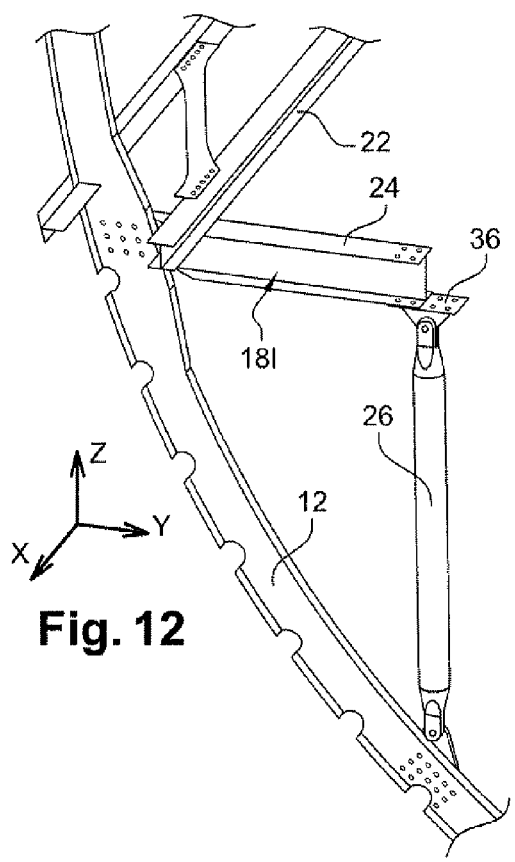
FIG. 12 is a view analogous to FIG. 3 showing a third embodiment.
Figure 13:
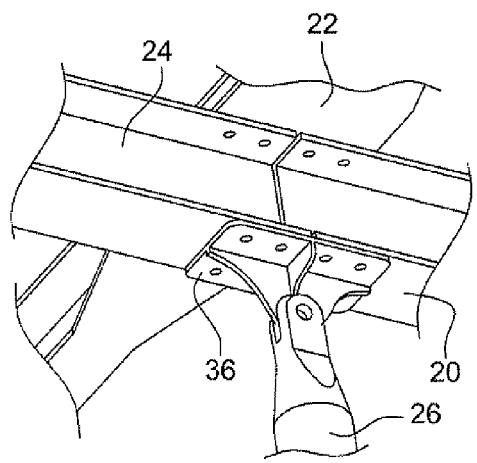
FIG. 13 is a perspective view showing a detail of how the structure of the FIG. 12 airplane is assembled.

In this example, each crossmember 20 is likewise a channel-section member, however of smaller dimensions than the batten 24, as can be seen in the section of FIG. 8. In the present reception, all three of the associated batten 24, crossmember 20, and post 26 overlap mutually as shown in FIG. 6. More precisely, three respective vertical walls of these three parts are superposed and in contact over an area, specifically, the wall of the batten is sandwiched between the wall of the crossmember and the wall of the post. These walls extend perpendicularly to the axis X. In the present embodiment, the channel-section of the crossmember is received inside the channel-section of the batten so that the outer front face of the crossmember lies against the inner rear face of the batten. The front face of the batten is in contact with the rear face of the post.

The assembly is made in such a manner that one of the rails 22 of the middle portion, the rail that is situated close to the edge of the middle portion, extends over the posts 26, with this happening on both sides of the middle portion. The recess 23 made at the end of the batten enables it to extend under this rail.

The batten, the crossmember, and the post are rigidly fastened together by rivets, each passing through the three respective walls of these parts. Other rivets provide direct rigid fastening between the batten and the crossmember without passing through the post. As shown in FIG. 5, provision may be made for each end of each crossmember to present additional thickness in its junction zone with the associated batten, post, and rail, for reinforcing purposes. In this zone, the thickness E of the wall is thus greater than the thickness e of the remainder of the wall.

Fabrication of the airplane 4 comprises the following steps in particular.

The fuselage is made with the frames 12 and the wall 4.

Then, inside the fuselage, the lateral portions 18l of the floor are installed. To do this, each lateral portion 18l is fastened firstly to the frames 12 of the fuselage, and secondly to the posts 26 that are themselves also connected to the fuselage. It should be observed that at this stage each of the left and right lateral portions does not constitute a single piece until it has been assembled with the fuselage.

After this assembly step, one or more members 70 of the airplane having a function other than a mechanical function for the floor or the fuselage is/are put into position under the lateral portions. By way of example, these members may be hydraulic or pneumatic (compressed air or air conditioning ducts, water ducts, refrigeration ducts, oxygen ducts), electric cables, fire extinguisher circuit elements, or indeed ducts of on-board communications networks.

In parallel with these operations (making the fuselage, installing the lateral portions, putting members into place), the middle portion 18m of the floor is made up by assembling the rails 22 with the crossmembers 20. Prior to inserting the middle portion into the fuselage, the middle portion is fitted with at least one member 70 of the airplane that has a function other than a mechanical function for the floor, such as those mentioned above by way of example.

Finally, the middle portion 18m fitted out in this way is inserted into the fuselage segment and is connected to the left and right lateral portions 18l by being rigidly fastened thereto.

In this example, the fuselage segment also includes anti-crash connecting rods 34 of generally rectilinear and plane shape. Each connecting rod extends in a horizontal plane, but in a direction that is oblique relative to the directions X and Y. It has a rear end fastened to one of the stringers 16 of the fuselage. This stringer is rigidly fastened to a plurality of frames 12, in this example it is fastened to four of them. The connecting rod 34 has its front end fastened to a rail 22 extending in the direction X and is itself rigidly fastened to a plurality of battens 24. The connecting rods 34 situated in the left portion of the fuselage are coplanar and oriented in the same horizontal direction. The same applies to the connecting rods situated in the right portion of the fuselage. The connecting rods situated on the left are oriented towards the right, while the connecting rods situated on the right are oriented towards the left. Unlike the rails 22 of the middle portion, the rail 22 that is fastened to the connecting rods is not designed to receive passenger seats, and in this sense it is referred to as a "dummy rail".

By means of the invention, it is possible to mount members 70 to the middle portion 18m prior to inserting the middle portion in the fuselage. In particular, it is possible to insert the middle portion after the fuselage segment has itself had its top portion closed. Mounting systems associated with the various portions of the floor prior to inserting the floor itself serves to reduce pollution generated by such mounting for all of the systems (in particular as a result of drilling operations). Similarly, mounting systems prior to inserting the floor makes mounting operations more ergonomic. The middle portion is fastened to the lateral portions in a zone of the fuselage that is relatively accessible such that putting rivets into place does not raise ergonomic problems.

The embodiment described above enables the middle portion 18m to be fitted relative to the lateral portions 18l in each of the directions Y and Z. In addition, the subassemblies formed by each batten-and-post pair present a certain amount of flexibility in the direction X, thus making it possible to fasten the middle portion 18m without running the risk of significantly deforming it if there is a problem with tolerances.

A second embodiment of the invention is shown in FIGS. 9 to 11. Elements that are not described again below are identical to elements of the above-described embodiment.

The battens 24 and the crossmembers 20 are once more channel-section members. Nevertheless, they are now fastened together back-to-back such that in this embodiment the outside faces of these two section members are in contact with each other. Likewise in this embodiment, the two channel-section members are generally of the same shape and of the same dimensions such that the top and bottom edges of the section members are coplanar, as shown in FIG. 11. Fastening is provided by rivets passing through the two overlapping walls in the direction X.

In this embodiment, the posts 26 are cylindrical in shape. Each post 26 is connected via its top and bottom ends to a lug in the form of a fitting 36 by means of a hinge about an axis 38 parallel to the direction X. The bottom fitting is rigidly fastened to the frame 12, while the top fitting is rigidly fastened to the bottom of the crossmember or to the bottom of the batten, or indeed to the bottom of both of them, by means of a horizontal plate 40. Once more, one of the rails 22 extends in register with the zone where the batten is fastened to the crossmember, and where these members are fastened to the post. The rail has its bottom face bearing against the top edge of the batten and of the crossmember. Nevertheless, it is not fastened directly thereto.

As in the above-described embodiment, this fastening technique provides degrees of freedom in the directions Y and Z so as to enable the position of the middle portion to be adjusted relative to the lateral portions. The way in which the airplane is assembled is the same as in the preceding embodiment.

A third embodiment of the embodiment is shown in FIGS. 12 to 16.

Figure 14:
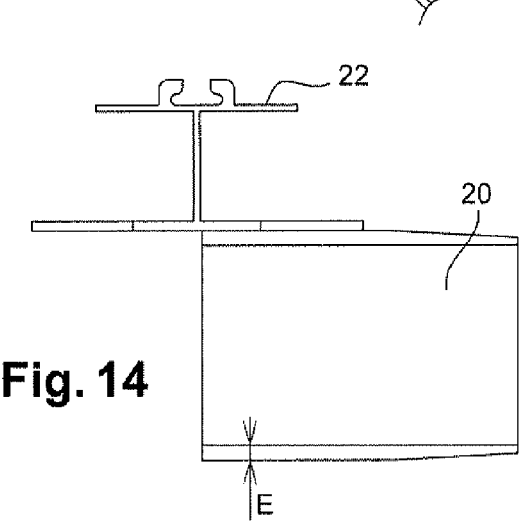
FIGS. 14 and 15 are respectively an elevation view and a side view of a portion of the FIG. 13 assembly.
Figure 15:
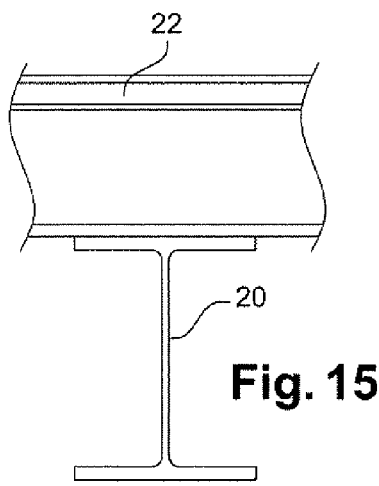
Figure 16:
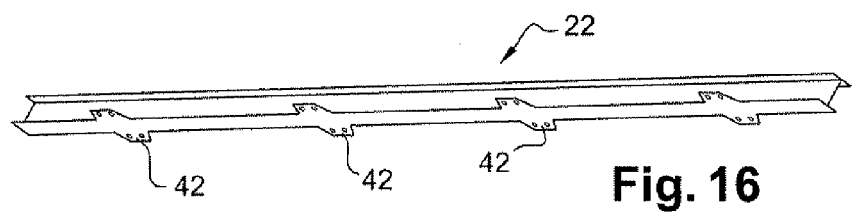
FIG. 16 is a perspective view of the FIG. 13 rail.
Figure 19:
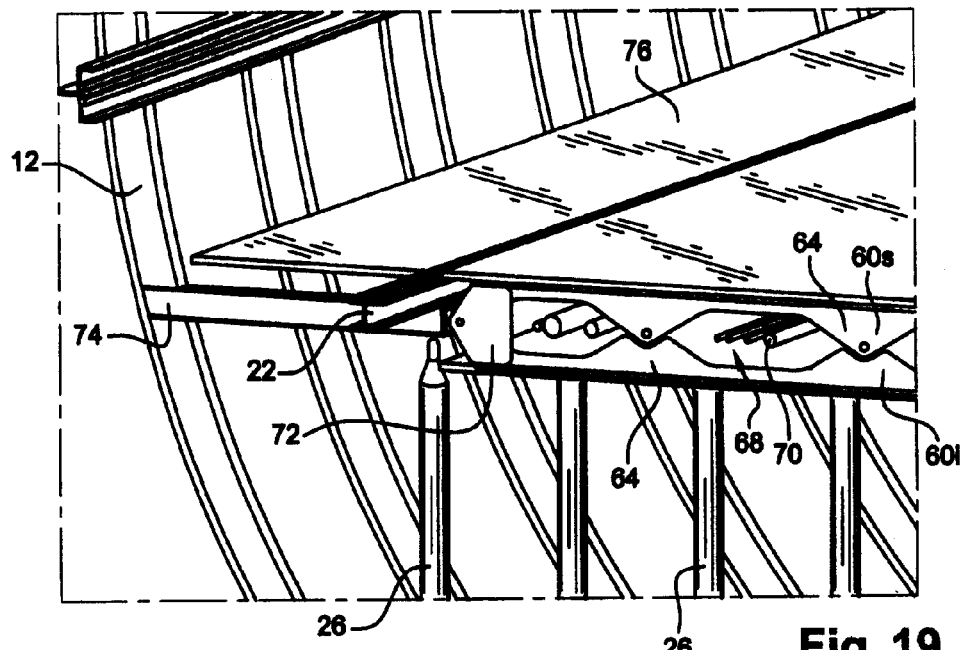
FIG. 19 is a perspective view of a portion of the FIG. 18 fuselage.

This time, the battens 24 are I section members except at their outer ends where they present only a plane web perpendicular to the direction X and coming into area contact against the plane wall of the frame 12. Each of the crossmembers 20 also presents a I section. The shape and the dimensions of this section are the same as those of the section of the batten. Each batten is rigidly fastened to the crossmember by extending in line therewith. For this purpose, the inside end of the batten and the end of the crossmember have their bottom edges resting on the fitting 36 of the post 26, to which they are fastened by means of rivets. Similarly and as previously stated, the rail 22 rests on the top edges of the batten and of the crossmember, to which it is directly fastened by means of rivets. It is solely by means of this fitting and this rail that the fastening is provided in this embodiment between the batten and the crossmember, with no direct fastening being provided between them. Fastening takes place via the horizontal flanges of the batten and of the crossmember. The rivets extend in a vertical direction. As can be seen in FIG. 16, the rail 22 presents a plurality of enlarged zones 42 in its base constituting plates that come into contact with each of the battens and the corresponding crossmember, respectively. Each plate provides a larger area for receiving rivets. As can be seen in FIG. 14, the wall of the crossmember in this location once more presents a greater thickness E than it does at its end, in the present example at its top and bottom edges, so as to reinforce it where it is fastened to the rails and to the posts.

Once more, this embodiment enables the position of the parts to be adjusted in the directions X and Y.

There follows a description of an aircraft in a fourth embodiment of the invention, with reference to FIGS. 17 to 26.

There follows a detailed description of the middle portion 58m, which in this embodiment does not have rails. Each crossmember 60 has a top partial crossmember 60s and a bottom partial crossmember 60i. Specifically, each of the partial crossmembers is a half-crossmember insofar as it constitutes substantially a bottom or a top half of the crossmember.

The bottom half-crossmember 60l presents a flange 67 forming its horizontal base and a vertical wall extending in a plane that is parallel to the directions Y and Z. The wall presents tongues 64 of generally triangular shape that extend it locally upwards. Specifically, there are five tongues in this example that are regularly spaced apart from one another along the half-crossmember. The top crossmember 60s presents an analogous arrangement with tongues 64 that extend downwards. The tongues of the top wall and of the bottom wall are located in the vicinity of one another so that their free ends overlap. In each overlap zone, one of which is shown in detail in FIG. 20, there is received a hinge pin 66 serving to fasten the top half-crossmember to the bottom half-crossmember by hinging together each pair of tongues 64. The pin extends parallel to the direction X. As shown in FIG. 20, in the present example, the tongues of the bottom partial crossmember penetrate into the hollowed-out free ends of the tongues of the top partial crossmember. Nevertheless, in a variant embodiment, as shown in FIG. 21, provision may be made for the top and bottom tongues merely to overlap in the direction X. By means of the hinge connections via the tongues between the partial crossmembers making up each crossmember, the two partial crossmembers of each crossmember are rigidly fastened together.

The partial crossmembers of each crossmember 60 define gaps 68 between consecutive pairs of tongues 64. In this example, there are six gaps 68 in each crossmember 60.

Given that the crossmembers 60 are mutually identical and arranged to coincide, the gaps 68 likewise coincide from one crossmember to the next. This defines elongate housings in the direction X that are defined above by the partial crossmembers 60s and below by the partial crossmembers 60l. These housings are used to house systems or members 70 of the kind mentioned above that have functions other than a function relating to the floor. For example, they may be hydraulic or pneumatic members (compressed air or air conditioning ducts, water ducts, refrigeration ducts, oxygen ducts), electric cables, fire extinguisher circuit elements, or indeed ducts for on-board communications networks. The gaps 68 that follow one another along a crossmember may receive members of types that differ from one gap to another.

Furthermore, on each crossmember, the two partial crossmembers are fastened together at each of the crossmembers by means of a respective connection part 72 that is rigidly fastened to each of the partial crossmembers. The connection part is also hinged to the associated batten 74 about an axis 75 that is parallel to the direction X. The hinge pins between the connection parts 72 and the battens are preferably situated on the neutral axis in bending of the crossmembers 60. The same applies for the pins 66.

The floor also comprises a top panel 76 resting on the top partial crossmembers 60s. Rails 22, two rails in this example, extending parallel to the direction X, are also provided in each lateral portion 58l of the floor. Each rail rests on one or more battens. The lateral ends of the panel rest on each of the rails 22. The floor also has a bottom panel 78 fastened to the base 67 of the bottom partial crossmembers 60i. The top panel 76 forms the bottom limit of the airplane cabin 80, while the bottom panel 78 forms the top limit of the airplane cargo zone 82.

There follows a description of an implementation of the method of the invention for making and installing the airplane floor.

Figure 22:
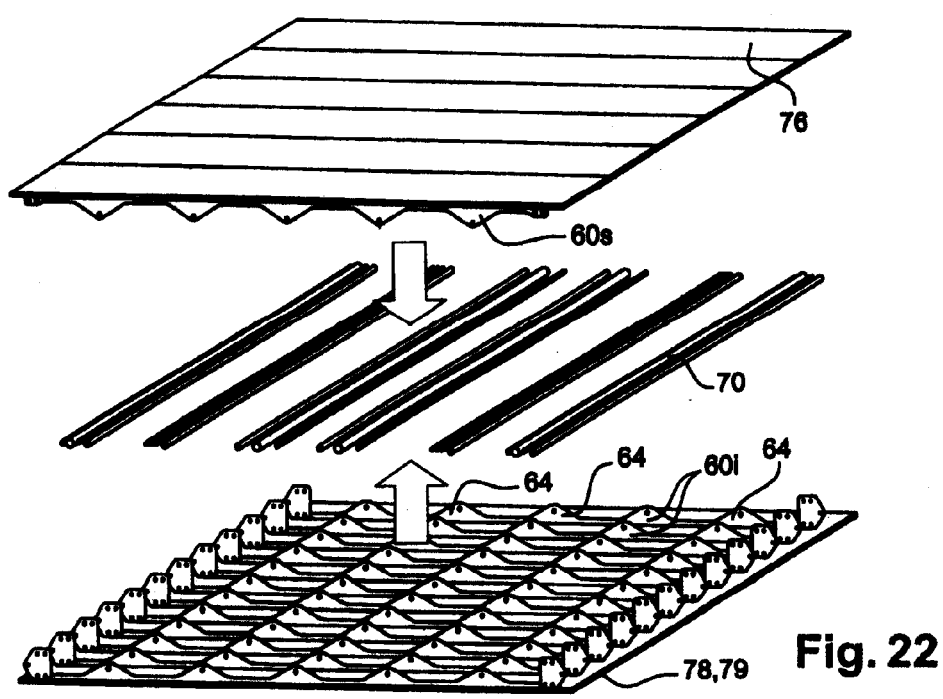
FIGS. 22 and 23 are two perspective views showing how the middle portion of the floor is made and how it is inserted in the fuselage.

With reference to FIG. 22, in order to fabricate the floor, the top partial crossmembers 60s are initially fastened to the top panel 76 in their final positions underneath it.

The bottom partial crossmembers 60i are also temporarily fastened on an assembly jig 79 in the final positions that they are to occupy relative to one another.

Thereafter, the arrangement shown in FIG. 22 is made by interposing between the members 70 that are to be housed in the gaps 68 between the subassembly of the panel 76 with the top partial crossmembers 60s on top and the subassembly of the jig 79 with the bottom partial crossmembers 60i underneath. The members 70 are also placed in the positions they are to occupy relative to one another.

Thereafter, all of these elements are moved towards one another in the vertical direction so as to form stack with the members 70 sandwiched between the two subassemblies. During this approach, the top partial crossmembers come into contact with the corresponding bottom partial crossmembers so as to form the crossmembers 60, and the gaps 68 are formed around the members 70 which are thus received therein.

The assembly jig 79 presents openings or hatches enabling one or more operators to put the hinge pins 66 into place whereby the tongues 64 of the top and bottom crossmembers are connected together. This ensures that the top partial crossmembers are rigidly fastened to the bottom partial crossmembers.

Thereafter, the bottom partial crossmembers may be separated from the jig 79 and moved away therefrom.

Thereafter, the fastener parts 72 are put into place and then the bottom panel 78 is put into place.

Figure 23:
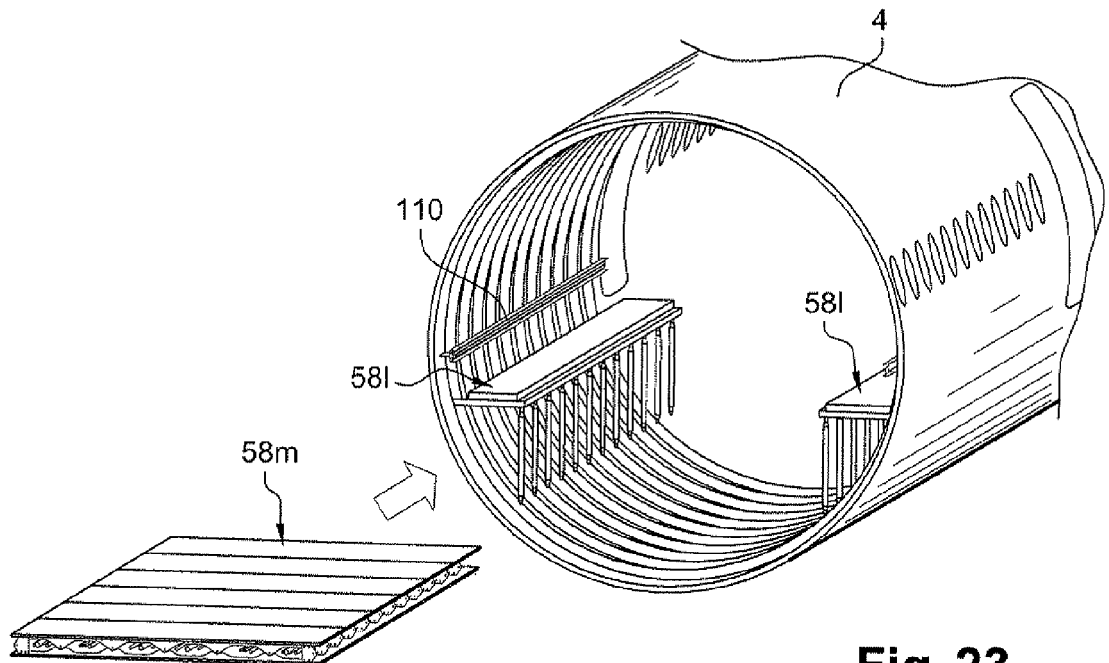

The middle portion of the floor 58m as made up in this way and as shown in FIG. 23 is then ready to be inserted into the destination fuselage segment.

Furthermore, the lateral floor portions 58l have already been mounted in this segment where they rest on the posts 26. Likewise, certain systems 70 analogous to the system 70 have already been put into place, in particular in the "triangular" zones defined on top by the battens 74 and laterally by the frames 12 and by the posts 26. Since the middle portion of the floor has not yet been installed at this stage, these members 70 can be put into place in a manner that is relatively comfortable for the operators.

It should be observed at this point that the middle portion of the floor 58m may be built up while the lateral portions 58l are being mounted in the fuselage and the systems 70 are being installed. These operations may therefore be performed in parallel (or simultaneously) in order to reduce the overall time taken to build the aircraft.

With reference to FIG. 23, the middle portion 58m is inserted in the fuselage segment. At this stage, the segment may already have its top portion closed, as shown in the figure, with insertion then taking place along the horizontal direction X. Once the middle portion has been received in position in register with the lateral portions 58l, it is fastened thereto by means of fasteners 72. This fastening may be performed at this stage without performing any drilling operations, where such operations are considered as being polluting for the members situated in the environment in which they are performed.

In a variant, provision may be made during construction of the middle portion 58m to constitute the bottom subassembly with the bottom partial crossmembers 60i and the bottom panel 78 for the purpose of making the sandwich, rather than using an assembly jig. Under such circumstances, one or more access hatches are provided through the bottom panel 78 so as to allow the pins 66 to be put into place.

Provision could also be made to replace such hinges with mutual engagements that fasten the top partial crossmembers to the bottom partial crossmembers as soon as they are positioned relative to one another in their final relative position.

For example, the middle portion may have a total height of 182 millimeters (mm). The gaps 68 may have a height of 100 mm, for example.

With reference to FIG. 17, the airplane 2 has a plurality of rows of passenger seats 84. The rows are parallel to the direction Y and they are disposed one behind another. In the present example, the airplane has a central aisle 86 intersecting the vertical longitudinal midplane of the fuselage. Specifically, each row has the same number of seats on either side of the aisle. In this example, there are three seats on the left and three seats on the right. The seats 84 in a row are mutually identical. Each of them has a seat back 88 and a seat proper 90.

Figure 24:
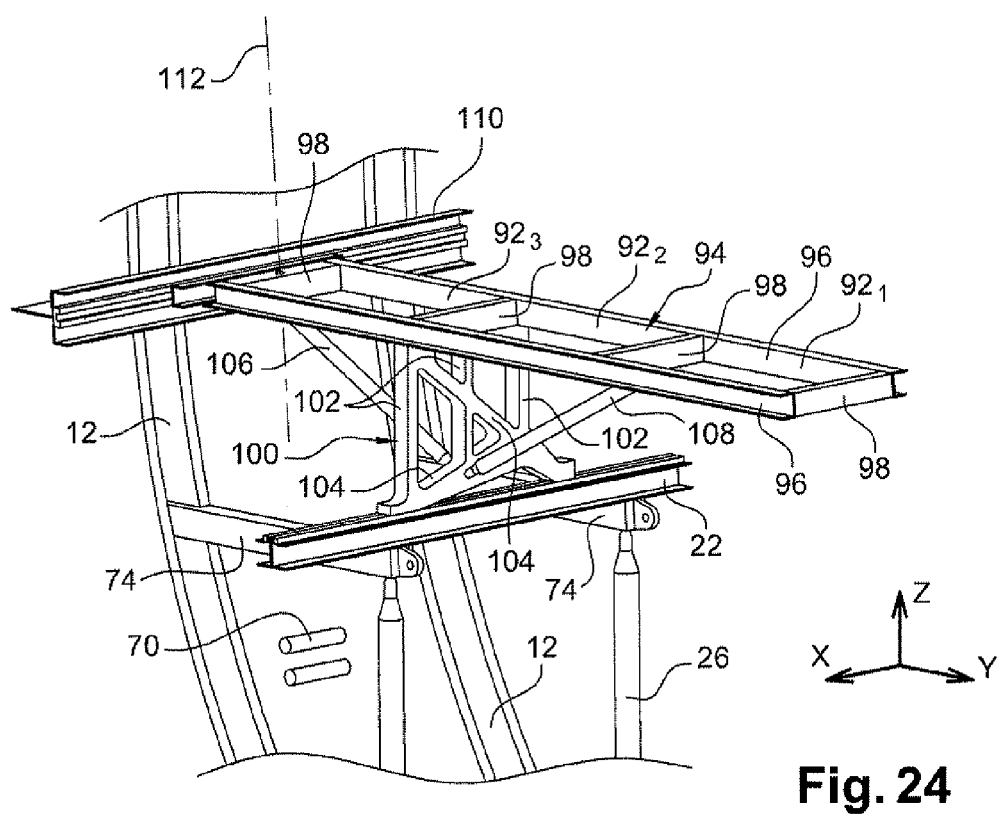
FIG. 24 is a perspective view of the FIG. 17 fuselage showing the seat supports.

With reference to FIG. 24, the seats of the row are associated with respective supports $92_1$, $92_2$, and $92_3$, each support fully supporting the corresponding seat. For convenience, the seats of the row corresponding to the respective supports $92_1$, $92_2$, and $92_3$ are given respective references, going from the aisle, of $84_1$, $84_2$, and $84_3$. Each support is formed by a rectangular frame extending in a horizontal plane. A seat is fastened via its seat proper to the corresponding support. In each row, the three supports $92_1$, $92_2$, and $92_3$ for the seats situated on one side of the aisle constitute a single part or base 94. The base comprises two spars 96 extending in the direction Y and four ribs 98 extending in the direction X. The two end ribs are located at the ends of the spars. The other two ribs are disposed respectively one-third and two-thirds of the way along them. Each support is defined by two of the ribs and by portions of both spars.

The base 94 is connected to the floor independently of the fuselage via a single leg 100 that is rigidly fastened to the base and that extends in a plane parallel to the directions X and Y. The leg extends at the junction between the two supports $92_2$ and $92_3$ that are the closest to the fuselage and the furthest from the aisle 86. The leg 100 extends in register with the rib 98 common to the supports $92_2$ and $92_3$. The leg 100 comprises three vertical uprights 102 and two ribs 104 that are inclined relative to the vertical direction. The leg 100 defines a front leg zone and a rear leg zone via each of which it bears directly on the floor. The leg is fastened directly to the rail 22 that bears on the battens 74. In this example, the leg lies in the same vertical plane as the posts 26 supporting the ends of the battens.

Two braces 106 and 108 connect the supports 92 to the bottom portion of the leg 100. One of the braces 106 extends from the rib 98 closest to the fuselage down to the leg. The other brace 108 extends from the rib 98 situated at the junction between the supports $92_1$ and $92_2$ down to the leg. Each of the braces is connected to the other parts via its ends by means of respective hinge connections about pins 107 parallel to the axis X. Both braces 106 and 108 extend in a common plane perpendicular to the direction X and situated halfway between the two spars 96.

The base is also fastened to the fuselage via a rail 110 parallel to the direction x and fastened directly to a plurality of the frames 12, being situated level with the base, the rail extending the base in the direction Y. Specifically, the base 94 is hinged to the rail 110 about a vertical pin 112.

It can thus be seen that the support $92_1$ of the seat adjacent to the aisle 86 is connected to the fuselage solely via the support $92_2$ of the adjacent seat in the row. In other words, it is the support $92_2$ that provides the entire support for the support $92_1$ and its seat $84_1$. The seats $84_1$ and $84_2$ are supported together in a cantilevered configuration. Independently of the hinge fastening to the fuselage, all three seats and their supports are supported by the floor via the single leg 100.

Such an arrangement serves to release the middle zone of the floor 58m from the loads that are transmitted by the seats. This is already advantageous when the floor is made as a single piece. However, in the present configuration, it can be understood that the entire middle portion 58m of the floor is relieved of any load transmitted by the seats, in particular in the event of a crash. Fastening the seat to the fuselage via the floor takes place only in the lateral portions 58l. There is thus no need to provide means in the middle portion for taking up the forces transmitted by the seats.

In addition, in the event of a crash, the loads generated by the seats are transmitted directly by the leg to the posts 26 and to the frames 12. At the end of the row remote from the aisle, transmission via the rail 110 also takes place directly to the frames 12.

In addition, fastening the middle portion 58m to the lateral portion 58l remains particularly simple since there is no need to fasten the middle portion to the seats, or vice versa.

Figure 25:
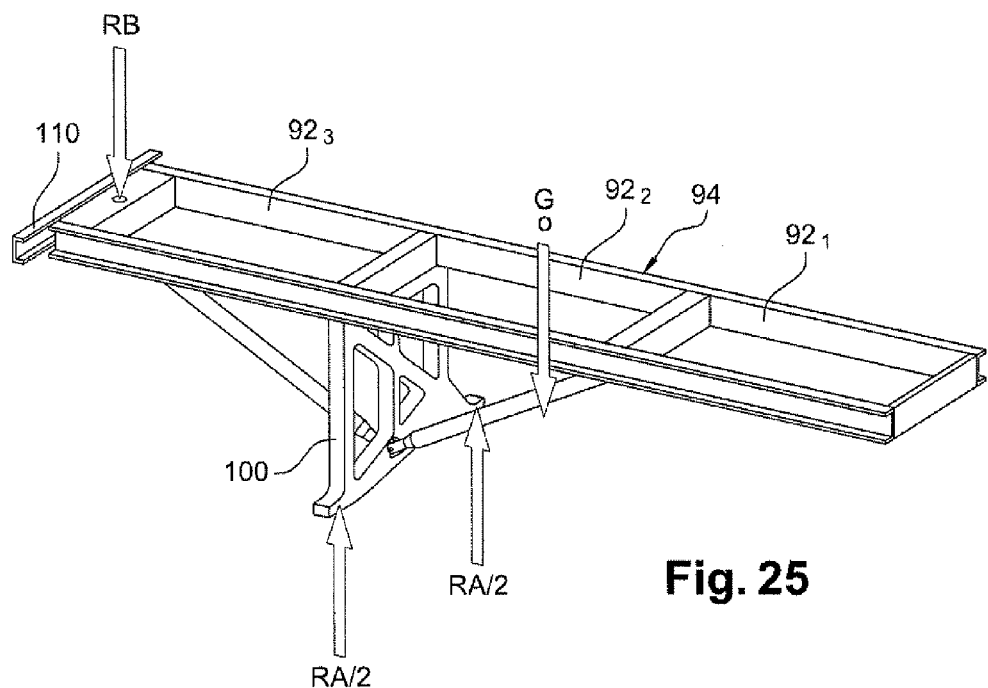
FIGS. 25 and 26 are perspective views of the seat supports showing force diagrams for two configurations of applied stresses.

FIG. 25 illustrates a situation in which a force G, e.g. of magnitude equal to six times gravity, is applied in the vertical direction downwards on the support $92_2$. This stimulates the force transmitted via the seats by the passengers in the event of the airplane impacting the ground vertically. This force acts above the plane of the support $92_2$. This force is balanced:

firstly by an upward vertical reaction RA transmitted by the fuselage to the leg 100, and more precisely two vertical reactions RA/2 transmitted to the ends of the leg; and secondly by a downward vertical reaction RB transmitted by the rail 110 to the end of the base.

Figure 26:
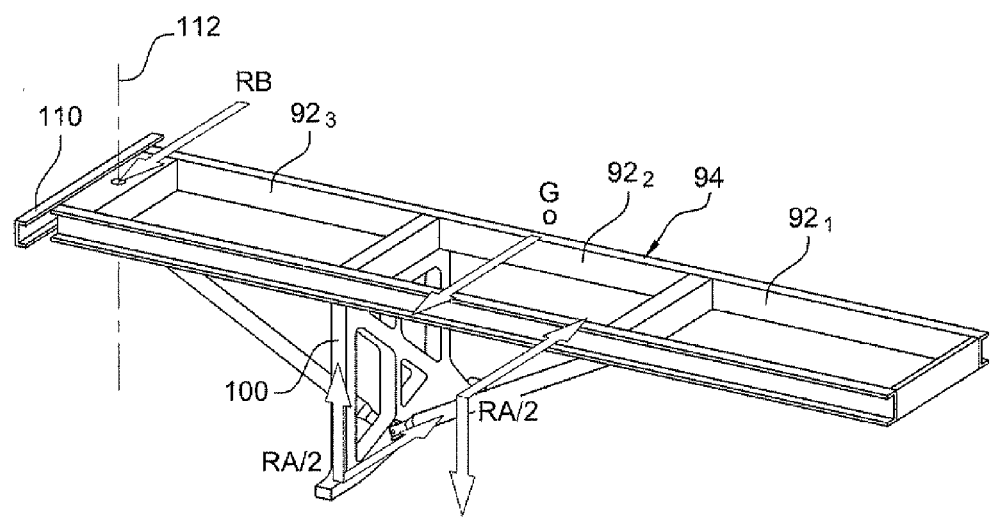

FIG. 26 illustrates another situation in which a force G, e.g. of magnitude equal to nine times gravity, is applied in the forward horizontal direction to the same point as in the preceding figure. This simulates a front impact.

This force gives rise to two reactions RA/2 at both bottom ends of the leg 100. Each of these reactions extends in the vertical plane of the leg and comprises a horizontal component extending rearwards and a vertical component extending upwards at the front and downwards at the rear. The force G also gives rise to a forward horizontal reaction RB transmitted by the rail 110 to the end of the base. In the absence of the hinge pin 112, reaction forces from the rail 110 to the base 94 would appear that extend in the direction Y. Fastening the base rigidly to the rail would, on impact, give rise to a bending moment about a vertical axis. Unfortunately, in the presence of an assembly that is highly statically undetermined, such stresses are difficult to quantify, thereby complicate the design of the parts. The hinge makes the assembly isostatic in a horizontal plane and therefore simplifies design. Nevertheless, this hinge is optional.

In all of the embodiments, the floor rests on the fuselage firstly via its lateral ends and secondly via the posts that serve to take up vertical forces. In each embodiment, the arrangement of the floor provides good takeup of crash forces in each of the directions X, Y, and Z. In addition, the middle portion is fastened to the lateral portions without excessive stress and in a manner that enables the parts to be well-matched.

The parts constituting the fuselage, the floor, and the seat supports may be made of metal.

Naturally, numerous modifications may be applied to the invention without going beyond the ambit thereof.

Independently of the invention, provision may be made to fasten members to the floor prior to fitting all or part of the floor to the fuselage.

Provision could be made so that only the seat located at the end of the row is cantilevered out.

Provision could be made for it to be the top partial crossmembers 60s that are fastened to an assembly jig on a temporary basis. Similarly, provision could be made for the access hatch(es) to be provided in the top panel 76.

It is possible to implement the characteristic relating to the seat adjacent to the aisle being supported by being connected to the fuselage solely via the support of the adjacent seat in the row, without the middle portion of the floor necessarily being made using partial crossmembers. By way of example, the middle portion may have crossmembers each constituted as a single piece, and longitudinal rails fastened rigidly to the crossmembers as in the first three embodiments.

The invention claimed is:

1. A method of fabricating an aircraft, comprising the following steps:
fastening two horizontal lateral floor portions, each firstly to a fuselage element and secondly to supports that are connected to the fuselage element; and then
bringing a middle floor portion between the lateral portions and connecting it to the lateral portions so that the overall shape of the floor is that of a horizontal plane,
wherein, the lateral portions are directly fastened to the middle portion.

2. A method according to claim 1, wherein, during the fastening step and before bringing in the middle portion, at least one member of the aircraft having a function other than a mechanical function for the floor or the fuselage is placed under the lateral portions.

3. A method according to claim 1, wherein, prior to bringing in the middle portion, the middle portion is fitted with at least one member of the aircraft that has a function other than a mechanical function for the floor.

4. A method according to claim 1, wherein, prior to bringing in the middle portion, top partial crossmembers are assembled with bottom partial crossmembers so as to form crossmembers of the middle portion, leaving at least one gap between the top partial crossmember and the bottom partial crossmember of each crossmember.

5. An aircraft, resulting from implementing a method according to claim 1.

6. An aircraft according to claim 5, wherein the lateral portions are directly fastened to the middle portion by means of faces of the lateral and middle portions that are perpendicular to a longitudinal direction of the fuselage.

7. An aircraft according to claim 5, wherein the lateral portions are fastened to the middle portion by means of faces of the lateral and middle portions that are horizontal.

8. An aircraft according to claim 5, wherein the lateral portions are fastened to the middle portion via at least one connection part.

9. An aircraft according to claim 5, wherein the middle portion includes crossmembers, each crossmember comprising a top partial crossmember and a bottom partial crossmember, with at least one gap being arranged between the top partial crossmember and the bottom partial crossmember of each crossmember.

10. An aircraft according to claim 5, including at least one row of passenger seats, the seats being associated with supports supporting respective seats in full, one of the seats being adjacent to an aisle, and the support of the seat that is adjacent to the aisle being connected to the fuselage and to the floor solely via the support of the seat that is adjacent thereto in the row.

11. An aircraft according to claim 5, wherein the lateral portions are fastened directly to the middle portion.

* * * * *